US 6,583,960 B2

(12) United States Patent
Berg

(10) Patent No.: US 6,583,960 B2
(45) Date of Patent: Jun. 24, 2003

(54) RAMP LOAD SLIDER WITH TRAILING EDGE EXTENDERS CONTROLLING LOAD WEAR

(75) Inventor: Lowell James Berg, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/725,969

(22) Filed: Nov. 29, 2000

(65) Prior Publication Data

US 2002/0063996 A1 May 30, 2002

Related U.S. Application Data

(60) Provisional application No. 60/193,557, filed on Mar. 31, 2000.

(51) Int. Cl.[7] .............................. G11B 5/60; G11B 15/64; G11B 17/32; G11B 21/20

(52) U.S. Cl. ..................................................... 360/236.5

(58) Field of Search .......................... 360/236.5, 236.7, 360/235.7, 235.9, 235.4, 234, 230

(56) References Cited

U.S. PATENT DOCUMENTS

| 4,670,806 A | * | 6/1987 | Ghose ..................... 360/235.7 |
| 4,757,402 A | * | 7/1988 | Mo .......................... 360/235.4 |
| 5,473,486 A | * | 12/1995 | Nepela et al. .............. 360/126 |
| 6,373,659 B1 | * | 4/2002 | Hamaguchi et al. ..... 360/234.3 |

* cited by examiner

Primary Examiner—Hoa T. Nguyen
Assistant Examiner—Julie Anne Watko
(74) Attorney, Agent, or Firm—Moser, Patterson & Sheridan, LLP

(57) ABSTRACT

An apparatus and method is presented for controlling initial load and unload wear on a slider by using a trailing edge extender. A slider for supporting a transducer proximate to a recording medium is disclosed. The slider includes a trailing edge extender positioned on a trailing edge to allow additional controlled wear to occur before a substrate of the slider contacts the recording medium. The trailing edge extender can be positioned at an outer corner on the trailing edge of the slider and at a transducer pad on the trailing edge of the slider. The trailing edge extender can include a depth of the step depth, cavity depth, or air bearing surface level depth. The method includes fabricating a trailing edge extender positioned on a trailing edge to allow additional controlled wear to occur before a substrate of the slider contacts the recording medium.

13 Claims, 4 Drawing Sheets

RAMP LOAD SLIDER WITH TRAILING EDGE EXTENDERS CONTROLLING LOAD WEAR

CROSS-REFERENCE TO RELATED APPLICATION

The present application claims the benefit of an earlier filed U.S. Provisional Application Serial No. 60/193,557, which was filed a Mar. 31, 2000, and is entitled "IMPROVED RAMP LOAD SLIDER."

BACKGROUND

In magnetic disc drives, ramp load disc heads contact the disc storage media while the heads are loaded onto the media. FIG. 1 shows a schematic of a typical recording head slider 100. The slider includes a trailing edge 101 and a disc head 102. FIG. 2 shows a picture of the trailing edge corner of the center pad 103 of such a slider after a large number of load and unload cycles 200. In FIG. 2, the corner 201 has changed in height after it is worn during ramp loading. The corner 201 has worn off at approximately the angle of the static attitude of the slider. The wear is due to the large (relative to flying attitudes) pitch and roll static attitude of typical parts.

The wear shown in FIG. 2 is on the trailing edge center pad. The slider body corners can acquire similar wear under even modest roll static attitude conditions. The wafer substrate 204 becomes the greater part of the slider body 200. The head overcoat 205, typically aluminum oxide, protects the head from environmental chemical attack.

During the initial load and unload cycles, media damage can occur where the slider contacts the media. This damage can decrease as the number of load and unload cycles increases, until at some point there is no additional wear with additional cycles. At this point, the head has completely "run in."

As the slider approaches the disc, there is typically no substantial air bearing effect from the corner of the slider or on the center pad because the static attitude angles are too large. There is typically no real opportunity for an air bearing to form. As the slider wears, however, a flat area 201 relative to the disc during loading can form. This flat can grow until it forms enough of an air bearing, which can result from the air compression due to the static attitude angles. This air bearing is adequate when the force on it is enough to overcome the static torque placed on the slider by the suspension. At this point, the loading on the disc becomes relatively benign because the slider can be loaded without any substantial solid-to-solid contact. If the head and disc interface has survived this long, it typically lasts indefinitely.

As in FIG. 2, the aluminum oxide 205 forming the trailing edge of the slider 202 is of finite thickness. If there is too much static attitude or too little disc speed for an air bearing to form, the aluminum oxide 205 will continue to wear until the much harder slider substrate 204 begins to contact the disc. It is desirable to minimize aluminum oxide thickness in recording head wafers to reduce cost and reduce pole tip thermal expansion. The center part of the aluminum oxide 202 is already etched away resulting in even less aluminum oxide to wear in. Therefore, it is desirable to find a way to control more effectively the ramp load and unload wear on the slider.

SUMMARY

The present invention relates to controlling initial load and unload wear on a slider. In particular the present invention relates to a trailing edge extender for controlling initial load and unload wear on a slider.

In one aspect of this invention, a slider for supporting a transducer proximate to a recording medium is disclosed. The slider includes a trailing edge extender positioned on a trailing edge. The extender allows additional controlled wear to occur before a substrate of the slider contacts the recording medium. The trailing edge extender can be positioned at an outer corner on the trailing edge of the slider. The trailing edge extender can be positioned at a transducer pad on the trailing edge of the slider. The trailing edge extender can include a depth of the step depth, cavity depth, or air bearing surface level depth.

The slider can include a second trailing edge extender positioned on the trailing edge of the slider. This second trailing edge extender can be positioned on an opposite side of the first trailing edge extender on the trailing edge of the slider. The trailing edge can be made of a material or combination of materials such as aluminum oxide, diamond-like carbon, aluminum nitride, and silicon carbide.

In another aspect of this invention, a method for fabricating a slider for supporting a transducer proximate to a recording medium is disclosed. The method includes fabricating a trailing edge extender positioned on a trailing edge. The extender allows additional controlled wear to occur before a substrate of the slider contacts the recording medium. The fabrication of the trailing edge extender can include depositing a ridge over a dice cut. The fabrication of the trailing edge extender can also include dicing a rowbar to form a partial ridge.

The details of one or more embodiments of the invention are set forth in the accompanying drawing and the description below. Implementations can provide advantages such as improved control of the ramp load and unload wear on the slider.

DETAILED DESCRIPTION

The present invention relates to controlling initial load and unload wear on a slider. In particular the present invention relates to a trailing edge extender for controlling initial load and unload wear on a slider.

Figure 1:
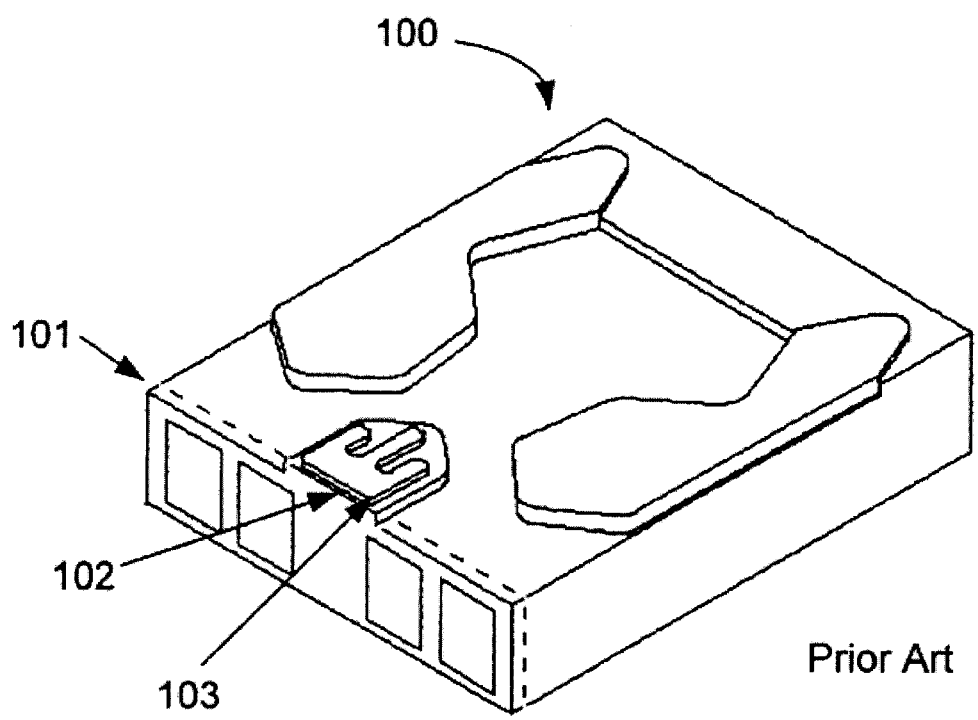
FIG. 1 is a drawing of a slider.
Figure 2:
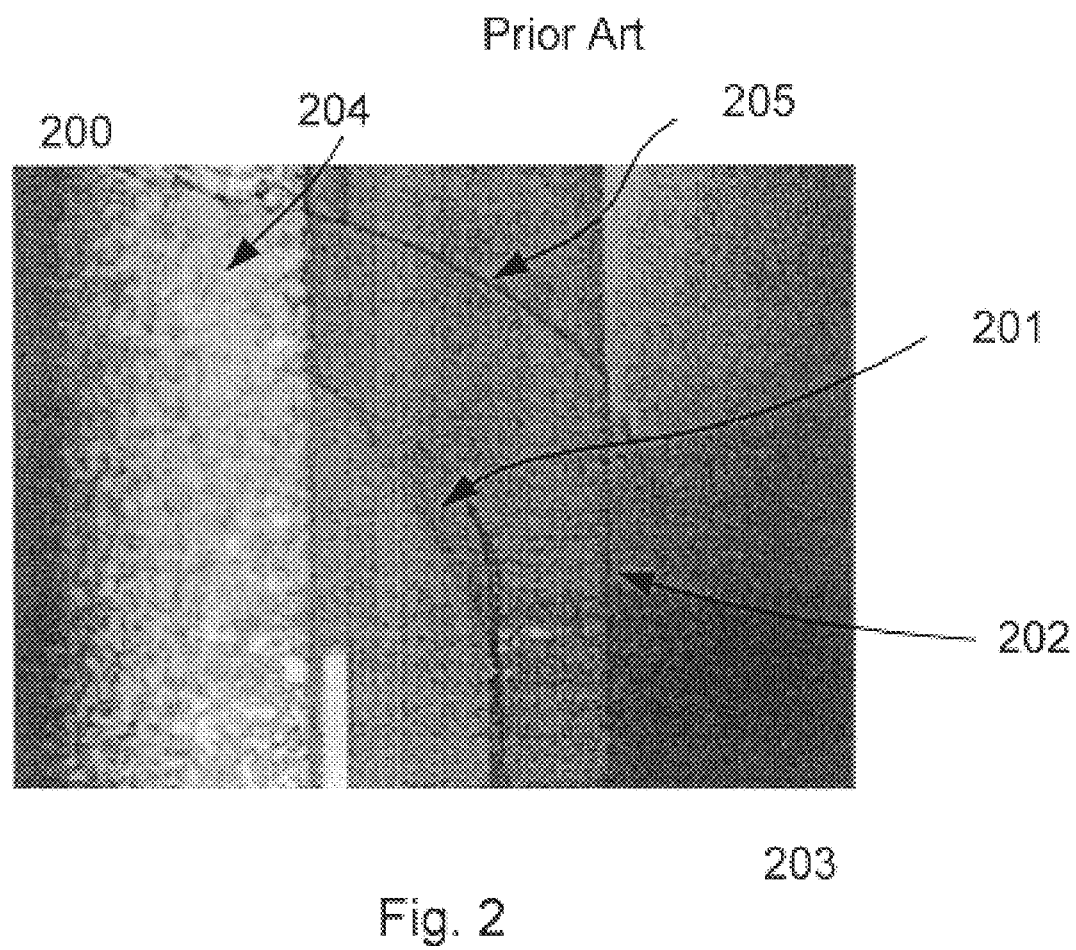
FIG. 2 is a picture of a worn slider head.
Figure 3:
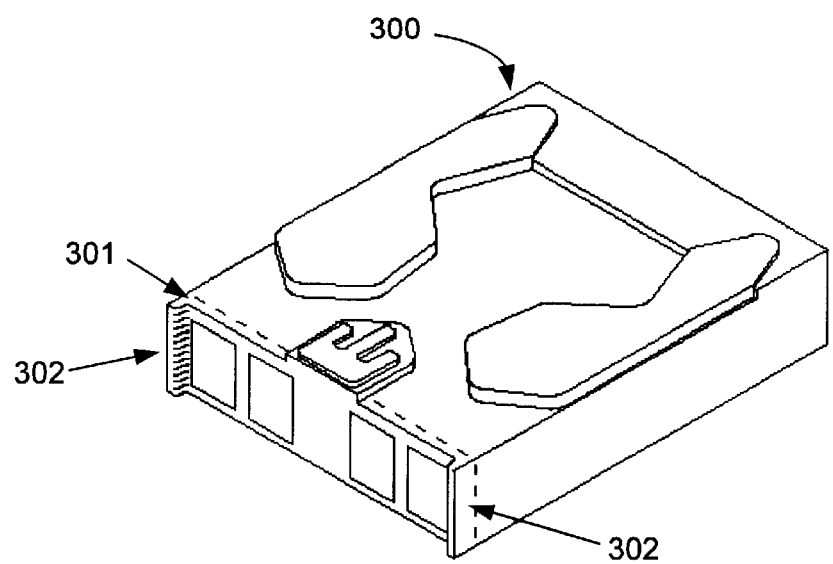
FIG. 3 is a drawing of a slider with the new trailing edge extender positioned on the outside edge of the slider.

FIG. 3 shows a slider 300 with extensions to the conventional aluminum oxide overcoat at the trailing edge cavity corners 301. The trailing edge extenders 302 can allow additional controlled wear to occur on the slider when it runs in against the media before the substrate begins to contact the media. The size of the extenders can be tailored to the wear characteristics of both the extender and disc media. The extension can be made of aluminum oxide, diamond like carbon, or any alternative wear material. If the overcoat material on the wafer is very thin then a corner pad may be required. This corner pad can be of any tribological material that can be patterned onto the completed wafer. The general geometry of the trailing edge extensions 302 in FIG. 3 is purely schematic. It may be desirable not to have a complete "hill" on the trailing edge corner 301 top to bottom. One may want to simply pattern bumps on the corners of the slider.

Figure 4:
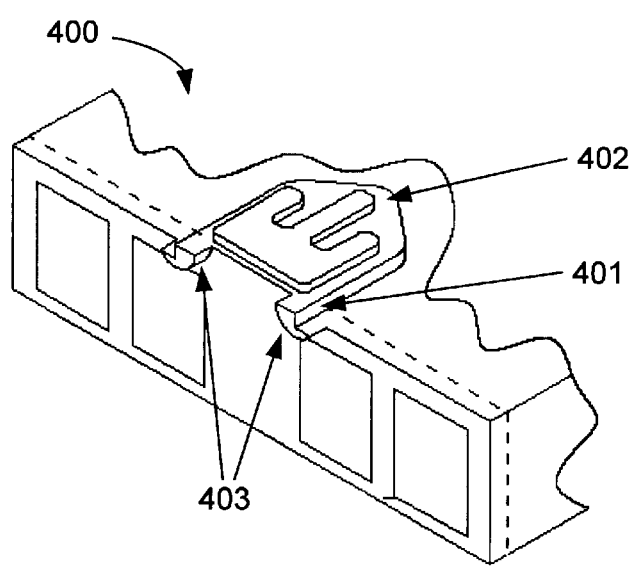
FIG. 4 is a drawing of a slider with the new trailing edge extender positioned next to the center pad of the slider.

Features fabricated at the wafer level as is shown in FIG. 4 can similarly protect the center pad 402. At the trailing edge of the etched step 401 on the corners of the center pad 402, two posts 403 are fabricated on the wafer. These posts 403 can be made of aluminum oxide or some other tribological material that can be patterned on the finished wafer. The center pad 402 typically is placed as close as possible to the trailing edge 401 of the slider, making it difficult to recess it. These pads are similar in function to the trailing edge extenders 302 in FIG. 3, but are likely to have different geometry.

Figure 5:
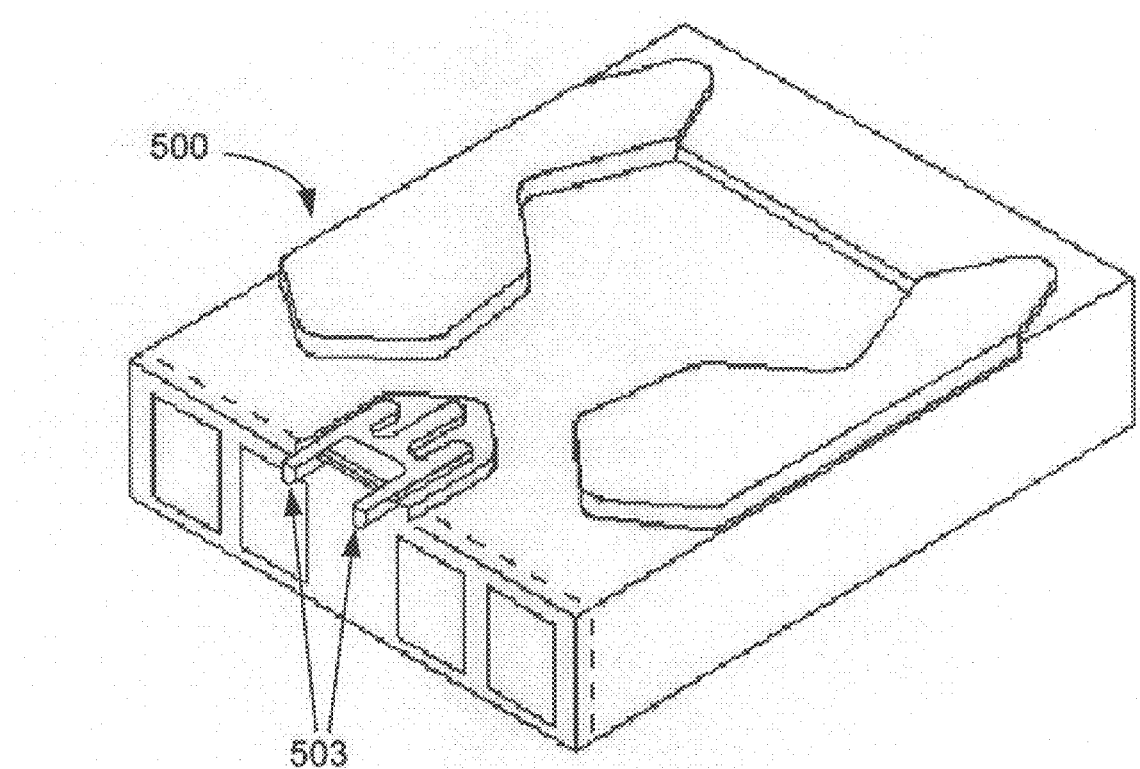
FIG. 5 is a drawing of a slider with the new trailing edge extender positioned at the air bearing level.

FIG. 5 shows an alternative embodiment with the trailing edge extenders 503 positioned at the air bearing level of the slider 500. The trailing edge extenders can be positioned at different depths along the slider. Examples of these depths include the cavity depth of FIG. 3, step depth of FIG. 4, and air bearing surface level of FIG. 5. Other depths or combinations of depths can be similarly used to protect the slider.

The trailing edge extenders can be fabricated on the trailing edge at the step depth, cavity depth, or air bearing surface level to allow additional controlled wear to occur before a substrate of the slider contacts the recording medium. The trailing edge extenders can be deposited on a completed wafer as a set of ridges over the dice cut. When the wafer is sliced, individual slider-level ridges are formed. The ridges may or may not span the dice alley. There can be one ridge per dice alley or two spanning a disc alley in the uncut wafer.

Cylindrical posts along the center pads can also be deposited and subsequently machined to slice, lap, and mill the slider into the resulting shape.

The trailing edge extenders can be fabricated using materials or combination of materials such as aluminum oxide, diamond-like carbon, aluminum nitride, and silicon carbide. Other similar materials can also be used.

Although FIGS. 1, 3, 4, and 5 show the transducer at the center of the slider body, the transducer may be located at different locations along the trailing edge, such as at the side rails or off-center along the trailing edge. The positioning of the transducer would not affect the functioning of the trailing edge extenders.

What is claimed is:

1. A slider for supporting a transducer proximate to a recording medium, the slider having a center air bearing pad extending along an air bearing surface to the center of the trailing edge of the slider upon which a transducer is formed, the slider comprising:
   a pair of trailing edge extenders positioned on a trailing edge and laterally spaced from each other on opposite sides of a center of said trailing edge, wherein the extenders allows controlled wear to occur before a substrate of the slider contacts the recording medium.

2. The slider of claim 1, wherein at least one trailing edge extender is positioned at an outer corner on the trailing edge of the slider.

3. The slider of claim 1, wherein at least one trailing edge extender is positioned at a transducer pad on the trailing edge of the slider.

4. The slider of claim 1, wherein the trailing edge extenders comprises a depth selected from the list consisting of the step depth, cavity depth, and air bearing surface level depth.

5. The slider of claim 1, wherein each trailing edge extender is positioned on the trailing edge of the slider substantially the same distance from the center of the trailing edge.

6. The slider of claim 1, wherein each edge extender comprises one or more materials selected from this list consisting of aluminum oxide, diamond-like carbon, aluminum nitride, and silicon carbide.

7. A slider for supporting a transducer proximate to a recording medium, the slider having a center air bearing pad extending along an air bearing surface to the center of the trailing edge of the slider upon which a transducer is formed, the slider comprising:
   a slider body; and
   a trailing edge extender means for allowing controlled wear to occur before a substrate of the slider contacts the recording medium.

8. A slider comprising:
   a leading edge and a trailing edge, the trailing edge having a center;
   a transducer positioned on the center of said trailing edge of said slider; and
   a pair of extension members laterally spaced from each other on opposite sides of the center of said trailing edge extending outwardly beyond said trailing edge, wherein said extension members control load wear on said slider.

9. The slider of claim 8, wherein the extension members comprise a depth selected from the list consisting of a step depth, cavity depth, and air bearing surface depth level.

10. The slider of claim 8, wherein the extension members comprise one or more materials selected from this list consisting of aluminum oxide, diamond-like carbon, aluminum nitride, and silicon carbide.

11. A slider comprising:
   a leading edge and a trailing edge, the trailing edge having a center;
   a transducer positioned on the center of said trailing edge of said slider;
   a center pad having a proximal and a distal end, said distal end of center pad positioned adjacent said trailing edge of said slider; and
   a pair of extension member laterally spaced from each other on opposite sides of the center of said trailing edge extending outwardly beyond said distal end of said center pad, wherein said extension members control load wear.

12. The slider of claim 11, wherein the extension members comprise a depth selected from the list consisting of a step depth, cavity depth, and air bearing surface depth level.

13. The slider of claim 11, wherein the extension members comprise one or more materials selected from this list consisting of aluminum oxide, diamond-like carbon, aluminum nitride, and silicon carbide.

* * * * *